(12) United States Patent
Huang et al.

(10) Patent No.: US 12,393,044 B2
(45) Date of Patent: Aug. 19, 2025

(54) VERTICAL GRATING FILTERS FOR PHOTONICS

(71) Applicant: Taiwan Semiconductor Manufacturing Company, Hsinchu (TW)

(72) Inventors: Tai-Chun Huang, New Taipei (TW); Stefan Rusu, Sunnyvale, CA (US)

(73) Assignee: TAIWAN SEMICONDUCTOR MANUFACTURING COMPANY, LTD., Hsinchu (TW)

(*) Notice: Subject to any disclaimer, the term of this patent is extended or adjusted under 35 U.S.C. 154(b) by 602 days.

(21) Appl. No.: 17/751,787

(22) Filed: May 24, 2022

(65) Prior Publication Data

US 2023/0384610 A1    Nov. 30, 2023

(51) Int. Cl.
  *G02B 27/42*  (2006.01)
  *G02B 5/18*   (2006.01)

(52) U.S. Cl.
  CPC ....... *G02B 27/4244* (2013.01); *G02B 5/1857* (2013.01); *G02B 27/4272* (2013.01)

(58) Field of Classification Search
  CPC .............. G02B 27/4244; G02B 5/1857; G02B 27/4272
  See application file for complete search history.

(56) References Cited

U.S. PATENT DOCUMENTS

| | | | |
|---|---|---|---|
| 6,317,539 B1 * | 11/2001 | Loh | G02B 6/29383 385/24 |
| 10,725,244 B2 | 7/2020 | Paquet et al. | |
| 11,187,852 B1 | 11/2021 | Bian et al. | |

FOREIGN PATENT DOCUMENTS

| | | | | |
|---|---|---|---|---|
| CN | 1297161 A | 5/2001 | | |
| CN | 1248020 C | 3/2006 | | |
| CN | 107111060 A | 8/2017 | | |
| CN | 110824612 A | * 2/2020 | ......... | G02B 6/12002 |
| CN | 113866878 A | 12/2021 | | |
| TW | 202102888 A | 1/2021 | | |

OTHER PUBLICATIONS

Machine translation of CN 110824612A (Year: 2020).*
Wei Shi et al, "Silicon photonic Bragg-grating couplers for optical communications," Proc. SPIE 9010, Next-Generation Optical Networks for Data Centers and Short-Reach Links, 90100F (Feb. 25, 2014); doi: 10.1117/12.2044096.
Taiwan Office Action of Application No. 11320363270 Dated: Apr. 15, 2024.

* cited by examiner

*Primary Examiner* — Lucy P Chien
(74) *Attorney, Agent, or Firm* — Lippes Mathias LLP

(57) ABSTRACT

A photonic vertical grating filter is disclosed. The filter comprises a first waveguide, a second waveguide, and a plurality of Bragg gratings. The Bragg gratings are formed in a dielectric layer between the first waveguide and the second waveguide, and are located in a vertical overlap region between the first waveguide and the second waveguide. Each Bragg grating has a different grating period. The vertical filter uses less surface area and provides improved filtering capabilities.

20 Claims, 16 Drawing Sheets

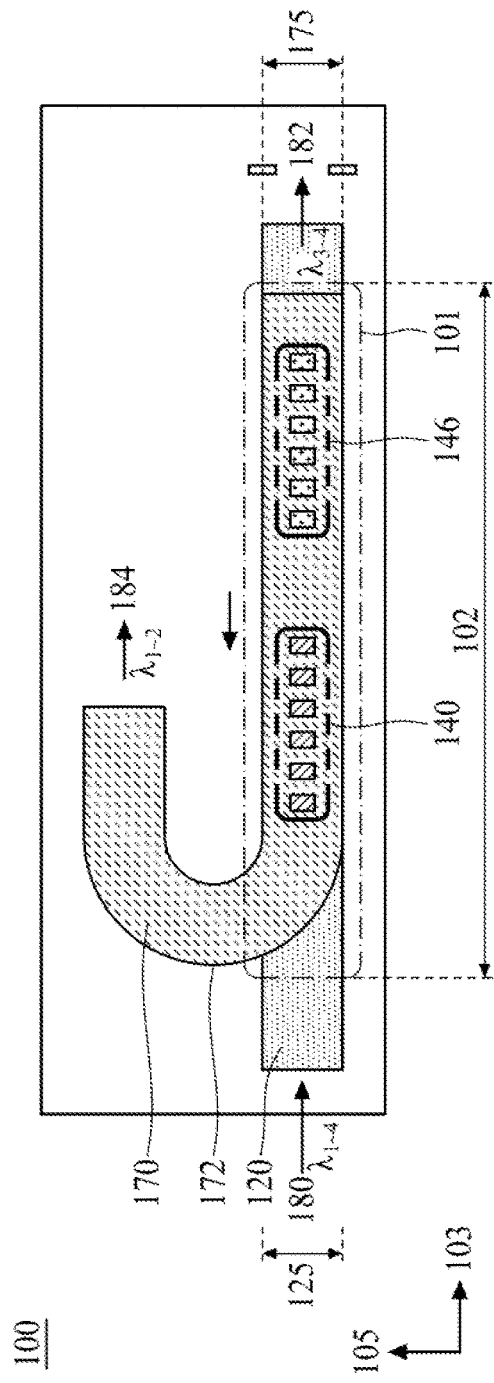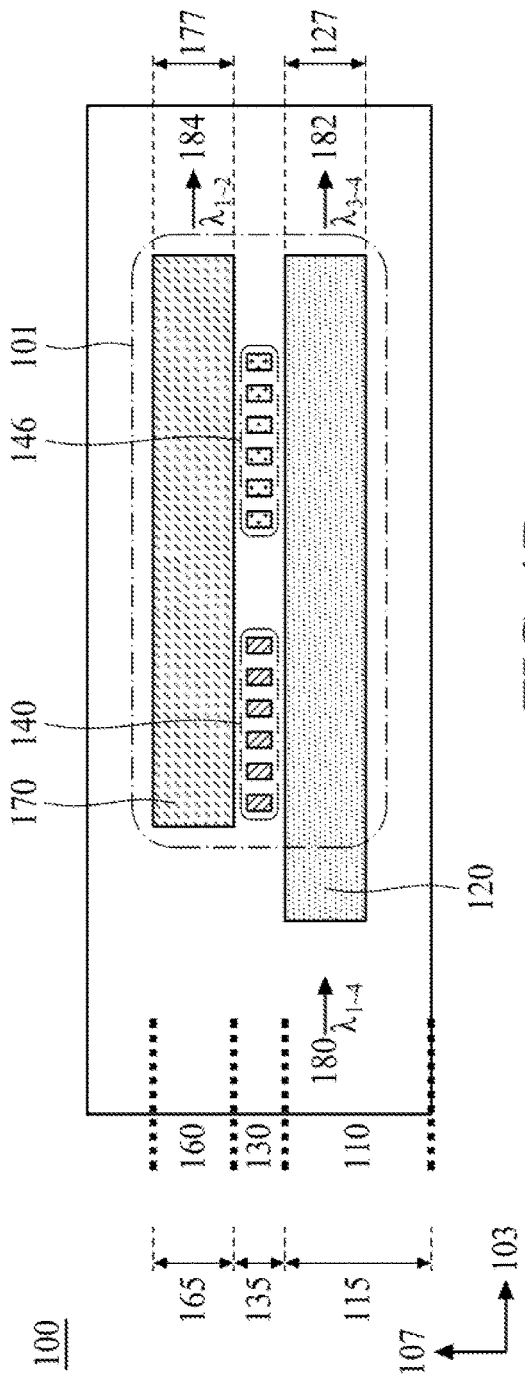
FIG. 1A
FIG. 1B

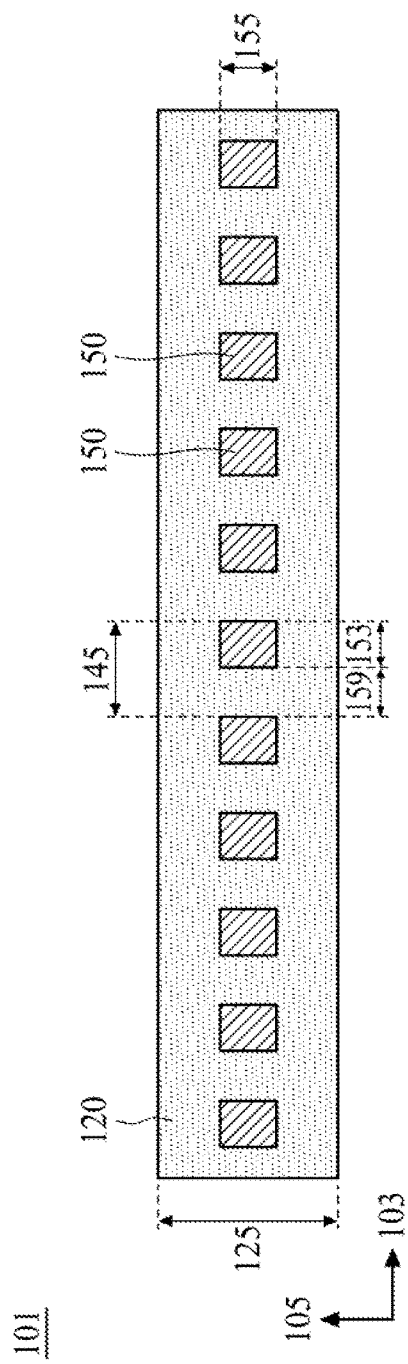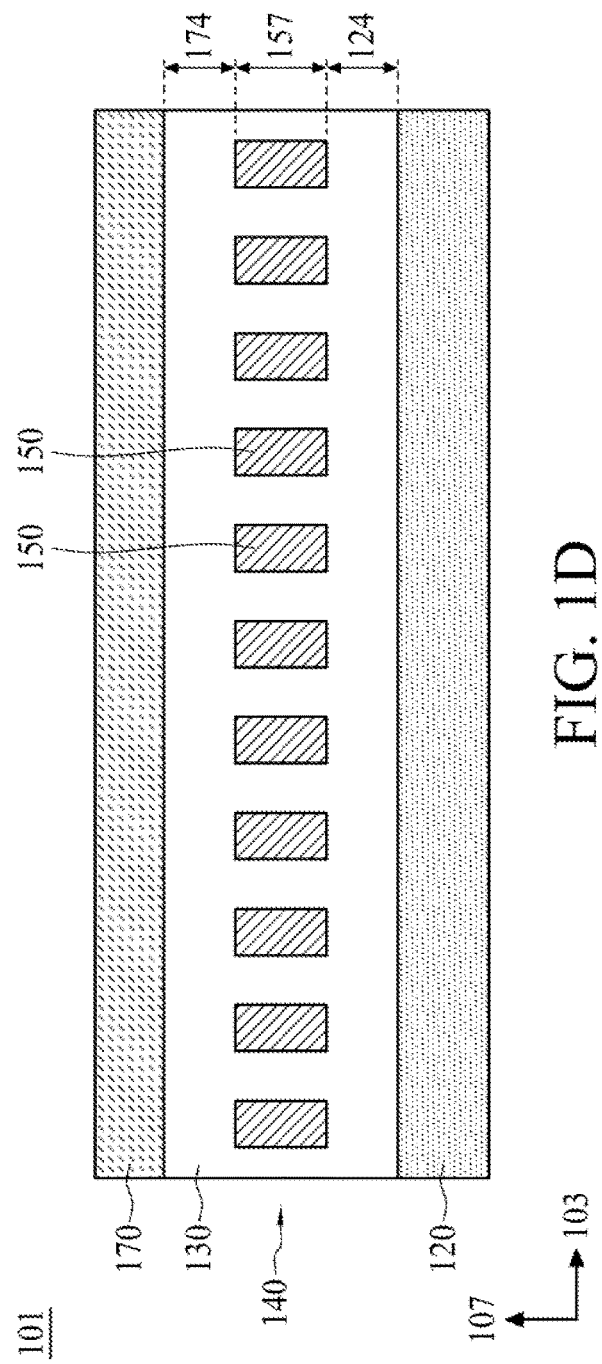

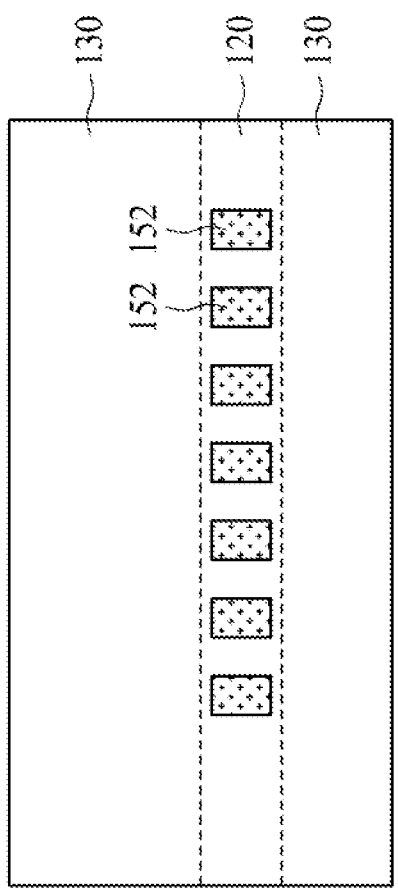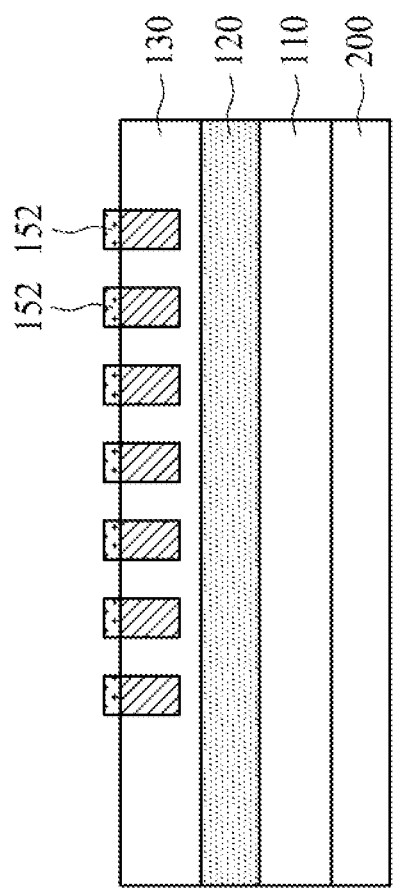

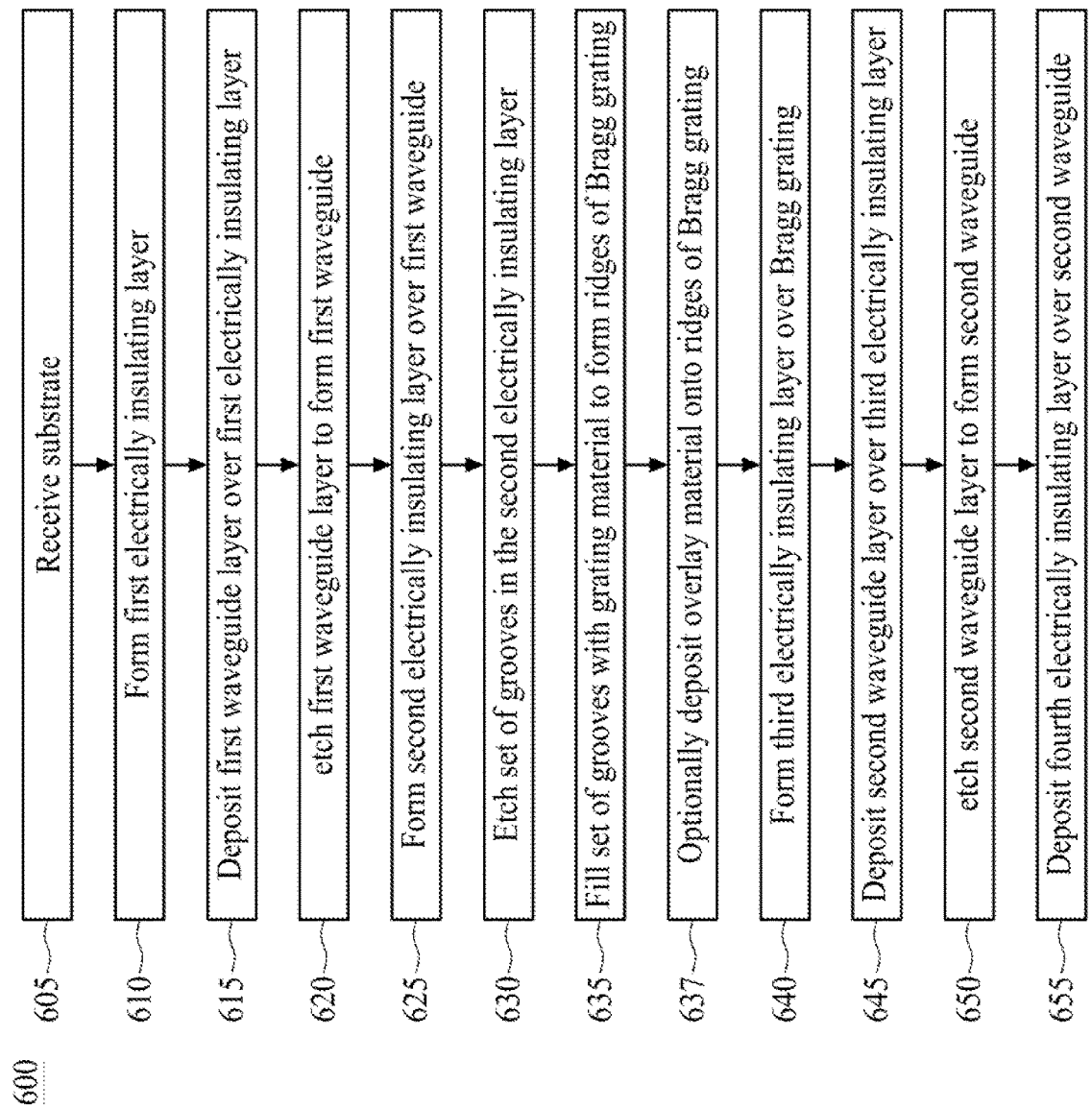

VERTICAL GRATING FILTERS FOR PHOTONICS

BACKGROUND

Silicon photonics has quickly become a mainstream technology, particularly in photonic integrated circuits (PICs). Such circuits are based on a silicon-on-insulator (SOI) platform to achieve high speed optical communication.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 1A-1D are various views of a photonic vertical grating filter, in accordance with some embodiments. FIG. 1A is a top view. FIG. 1B is a side cross-sectional view. FIG. 1C is a magnified top view of a portion of the vertical overlap region, focusing on a Bragg grating of the photonic vertical grating filter. FIG. 1D is a magnified side cross-sectional view of the vertical overlap region and the Bragg grating.

FIGS. 5A-5J illustrate various cross-sectional views of intermediate stages for forming the photonic vertical grating filter as described in FIG. 4.

FIG. 6 is a flow chart illustrating a second method for making the photonic vertical grating filter, in accordance with some embodiments.

DETAILED DESCRIPTION

Figure 2:
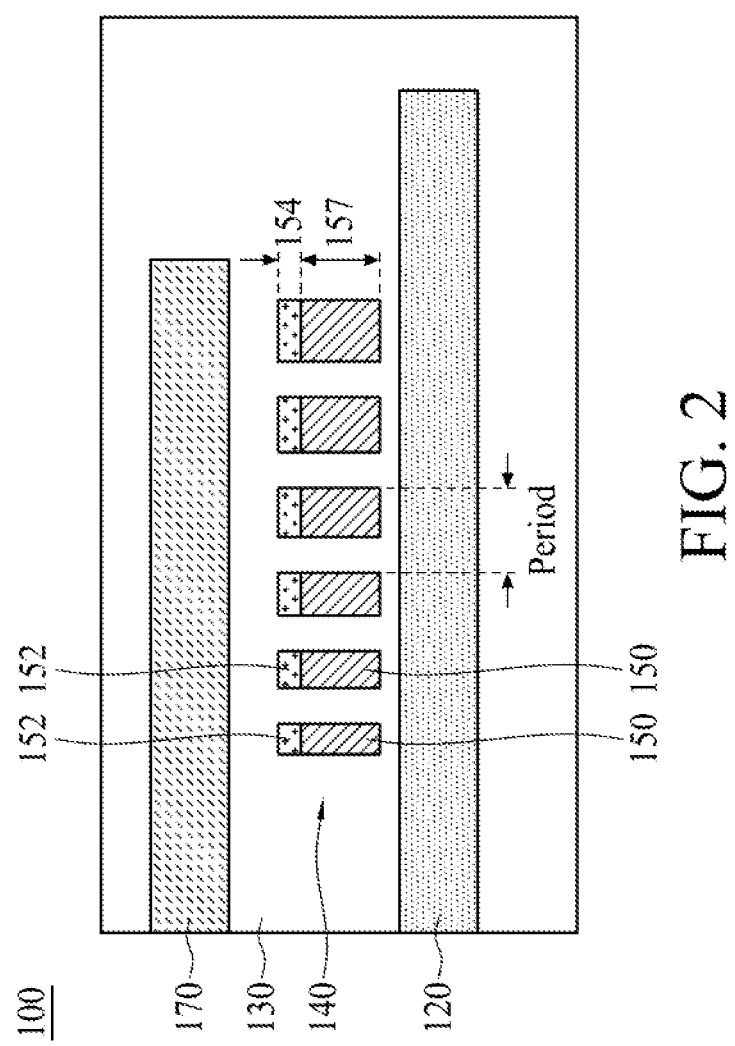
FIG. 2 is a magnified side cross-sectional view of a second embodiment of the Bragg grating of the photonic vertical grating filter. Here, the Bragg grating includes an overlay.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Numerical values in the specification and claims of this application should be understood to include numerical values which are the same when reduced to the same number of significant figures and numerical values which differ from the stated value by less than the experimental error of conventional measurement technique of the type described in the present application to determine the value. All ranges disclosed herein are inclusive of the recited endpoint.

The term "about" can be used to include any numerical value that can vary without changing the basic function of that value. When used with a range, "about" also discloses the range defined by the absolute values of the two endpoints, e.g. "about 2 to about 4" also discloses the range "from 2 to 4." The term "about" may refer to plus or minus 10% of the indicated number.

The present disclosure relates to photonic devices which are made up of different layers. When the terms "on" or "upon" are used with reference to two different layers (including the substrate), they indicate merely that one layer is on or upon the other layer. These terms do not require the two layers to directly contact each other, and permit other layers to be between the two layers. For example all layers of the photonic device can be considered to be "on" the substrate, even though they do not all directly contact the substrate. The term "directly" may be used to indicate two layers directly contact each other without any layers in between them.

The present disclosure relates to photonic vertical grating filters which can be used in a photonic integrated circuit. In this regard, a waveguide is commonly formed from a core surrounded by a cladding, with the refractive index of the core being greater than the refractive index of the cladding. Bragg gratings can be constructed within the core of the waveguide to cause reflection. However, they cannot achieve broadband reflection (greater than 40 nm bandwidth) or high reflection intensity (greater than −3 dB). Thus, the waveguide typically requires a larger surface area and a longer length to increase the reflection intensity. The photonic vertical grating filters of the present disclosure reduce the surface area, i.e. minimize the footprint of the filter.

FIGS. 1A-1D are different views of one embodiment of the photonic vertical grating filter of the present disclosure. FIG. 1A is a top view of the entire filter. FIG. 1B is a side cross-sectional view of the entire filter. FIG. 1C is a magnified top view of a portion of the vertical overlap region 101, showing more details of a Bragg grating of the photonic vertical grating filter. FIG. 1D is a magnified side cross-sectional view of a Bragg grating in the vertical overlap region.

Referring first to FIG. 1A and FIG. 1B, the photonic vertical grating filter 100 includes a first waveguide 120 and a second waveguide 170 located above the first waveguide 120. The first waveguide 120 is located in a first optical routing layer 110, and the second waveguide 170 is located in a second optical routing layer 160. A dielectric layer 130 is present between the first waveguide 120 and the second waveguide 170. The dielectric layer 130 is also located between the first optical routing layer 110 and the second optical routing layer 160. The refractive index of the dielectric layer 130 is lower than the refractive index of each of the first waveguide 120 and the second waveguide 170. Thus, the dielectric layer acts as a cladding, and encourages total internal reflection within the first waveguide and the second waveguide.

In some particular embodiments, the first waveguide 120 and the second waveguide 170 are made of the same material. In more specific embodiments, the first waveguide and the second waveguide are made of silicon nitride ($Si_3N_4$) or silicon. The first optical routing layer 110, the dielectric layer 130, and the second optical routing layer 160 may be made of any dielectric material having a lower refractive index than the first waveguide and the second waveguide. In some particular embodiments, these three layers are made of silicon dioxide ($SiO_2$). For reference, silicon has a refractive index of about 3.6, silicon nitride has a refractive index of about 1.98, and silicon dioxide has a refractive index of about 1.45.

One or more Bragg gratings as present within the dielectric layer 130. Two Bragg gratings 140, 146 are illustrated here, although any number of Bragg gratings may be used in the filter. For example, in some embodiments, the filter may include as many as 16 different Bragg gratings. The region in which the first waveguide 120, the second waveguide 170, and the Bragg gratings 140, 146 overlap vertically is labeled here as a vertical overlap region 101.

Each Bragg grating has a different period, and thus each Bragg grating acts as a filter for a different central wavelength. Each Bragg grating operates as a distributed Bragg reflector, which reflects the central wavelength and the wavelengths around the central wavelength within the bandwidth in a Gaussian manner.

Also indicated is an optical input 180 into the first waveguide 120. As a non-limiting example, the optical input includes four wavelengths and is labeled as $\lambda_{1-4}$. The optical input passes through the vertical overlap region 101 of the filter and is separated into two different outputs. The output that is not filtered (i.e. unfiltered wavelengths) remains in the first waveguide, and is referred to herein as a throughput 182. The throughput here is labeled as $\lambda_{3-4}$. The wavelengths that are reflected by the two Bragg gratings 140, 146 illustrated here (i.e. the filtered wavelengths) are transferred from the first waveguide 120 to the second waveguide 170, and are referred to here as the filtered output 184. The filtered output here is labeled as $\lambda_{1-2}$. It should be noted that there is no other input to the second waveguide 170 other than the wavelengths that pass through the Bragg gratings 140, 146.

As illustrated, the optical input 180 comes in from the left-hand side and travels to the right-hand side. Due to the reflection of the Bragg grating, the filtered output/light 184 in the second waveguide 170 initially travels towards the left-hand side. Thus, the two waveguides can also be described as a contra-directional coupler. The second waveguide 170 may also include a bend 172 to direct the filtered output 184 in any desired direction, which is illustrated here as being towards the right-hand side as well.

Continuing, the length of the various components of the grating filter is determined by considering the first waveguide 120 to be straight and to define the axis in which the length is measured. The length axis is indicated with reference numeral 103. The axis 105 in which the width is measured is normal to the length axis 103, and in the horizontal direction within a given layer. The axis 107 in which the height or thickness is measured is normal to both the length axis 103 and the width axis 105, and is in the vertical direction and will pass through multiple layers.

The vertical overlap region 101 has a length 102. The width of the first waveguide 120 is indicated with reference numeral 125, and the thickness of the first waveguide is indicated with reference numeral 127. Similarly, the width of the second waveguide 170 is indicated with reference numeral 175, and the thickness of the second waveguide is indicated with reference numeral 177. The width 125, 175 of each waveguide may independently be from about 50 nanometers to about 5000 nanometers. The thickness 175, 177 of each waveguide may independently be from about 50 nanometers to about 1200 nanometers. It is noted that generally, the width of the two waveguides is about equal, to improve the coupling efficiency between the first waveguide and the second waveguide (or in other words, to maximize capture of the reflected light power or energy from the first waveguide by the second waveguide). While the shape of the two waveguides is shown in the top view of FIG. 1A as being rectangular, generally, any shape may be used, with the two waveguides having the same shape, again for the purpose of maximizing the coupling efficiency.

Referring now to FIG. 1C and FIG. 1D, the details of one Bragg grating 140 are illustrated above the first waveguide 120. The grating is formed from a plurality of ridges 150, and is formed within the dielectric layer 130. The length between the front surface of adjacent ridges is the grating period 145. In specific embodiments, the grating period of the Bragg grating is from about 100 nanometers to about 500 nanometers. This grating period is suitable for processing of light wavelengths in the O-band (1260 nm to 1360 nm) and the C-band (1530 nm to 1650 nm), which are commonly used for data communication and telecommunication, respectively. In some embodiments, the number of ridges in the Bragg grating is from about 30 to about 200.

The length of each ridge in the Bragg grating is indicated with reference numeral 153. In particular embodiments, the length of each ridge in the Bragg grating is from about 1% to about 99% of the period for the Bragg grating. The distance between the rear surface and the front surface of adjacent ridges is the spacing between ridges, and is indicated with reference numeral 159. In particular embodiments, the spacing is also from about 1% to about 99% of the period. Together, the sum of the length 153 and the spacing 159 equals the grating period 145. The overall length of the Bragg grating, the length of the ridge, and the spacing between ridges may vary depending on the wavelength that is selected for reflection for a particular Bragg grating.

The width of each ridge is indicated with reference numeral 155, and the thickness/height of each ridge is indicated with reference numeral 157. In particular embodiments, the width 155 of each ridge is from about 30% to about 100% of the width 125 of the first waveguide (see FIG. 1A). In particular embodiments, the thickness/height 157 of each ridge in the Bragg grating is from about 100 nanometers to about 1000 nanometers. Referring to FIG. 1C, it is noted that each ridge is generally located within the center of the vertical overlap region 101, first waveguide 120, or second waveguide 170 in the width axis 105. This placement improves the coupling efficiency between the two waveguides.

Referring more specifically to FIG. 1D, the ridges 150 are illustrated as generally being located in the center of the dielectric layer 130 along the height axis 107. However, the ridges 150 do not have to be in the center of the dielectric layer along the height axis. The gap between the ridges 150 and the first waveguide 120 is indicated with reference numeral 124. The gap between the ridges 150 and the second waveguide 170 is indicated with reference numeral 174. In particular embodiments, each gap 124, 174 is independently from about 5 nanometers to about 600 nanometers.

The ridges 150 are formed from a grating material or dielectric material that has a higher refractive index than the dielectric layer 130. For example, the ridges may comprise hafnium oxide (RI~1.88), zirconium oxide (RI~2.11), aluminum oxide (RI~1.75), hafnium silicate (RI~2.22), zirconium silicate (RI~1.78-1.99), hafnium oxynitride (RI~2.0-2.3), zirconium oxynitride (RI~2.0-4.7), silicon oxynitride (RI~1.46-2.1), boron nitride (RI~2.08), silicon carbide (RI~2.58), silicon nitride (RI~1.98), or silicon (RI~3.6), depending on the material from which the dielectric layer 130 is made. In some particular embodiments, the ridges are made from hafnium oxide or zirconium oxide. The selection of material for the ridges will affect the wavelength that is reflected by the Bragg grating, and the material can be modified using known methods to obtain the desired refractive index.

In particularly desirable embodiments, the dielectric material of the ridges is a high-k dielectric material (which has a dielectric constant greater than 3.9). In some embodiments of the present disclosure, the high-k dielectric material has a dielectric constant of at least 5, or at least 7, or at least 10. The high-k dielectric material may have a maximum dielectric constant of about 30.

It is specifically contemplated that within a particular Bragg grating, the ridges all have the same shape, length 153, width 155, thickness 157, spacing 159, and gaps 124, 174. In addition, within a particular Bragg grating, the ridges are made from the same dielectric material. Between Bragg gratings, any combination of these properties may be changed, resulting in different central wavelengths between the Bragg gratings.

Referring back to FIG. 1A and FIG. 1B, the first optical routing layer 110 has a thickness 115, the dielectric layer 130 has a thickness 135, and the second optical routing layer 160 has a thickness 165. These layers have a thickness sufficient to separate the first waveguide 120, the Bragg grating(s) 140, and the second waveguide 170 and to cause reflection as needed for operation of the photonic device.

FIG. 2 is a magnified side cross-sectional view of a second embodiment of a Bragg grating 140 which can be used in the photonic vertical grating filter. In this embodiment, each ridge 150 includes an overlay 152. Put another way, each ridge is made of two different materials that have different refractive indices. The overlay is applied upon the ridge, and has a thickness 154. In particular embodiments, the thickness 154 of the overlay is from about 5% to about 60% of the thickness 157 of the ridge 150. The overlay is also formed from a dielectric material that has a higher refractive index than the dielectric layer 130. The use of an overlay can change the reflected central wavelength of the grating, increase the reflection intensity, and/or increase the bandwidth of the Bragg grating.

Figure 3A:
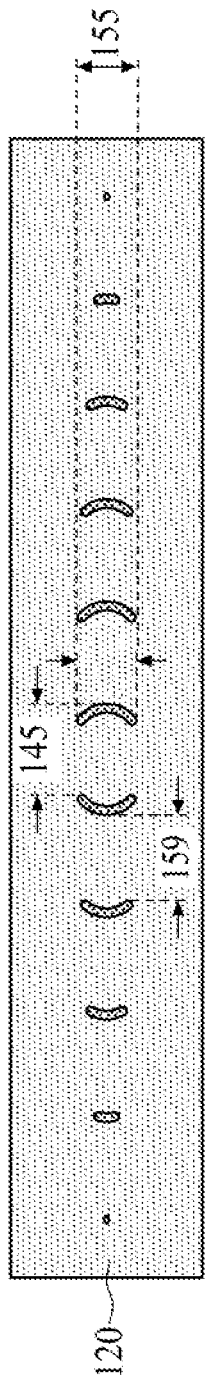
FIG. 3A is a magnified top view of a third embodiment of the Bragg grating of the photonic vertical grating filter. Here, the Bragg grating is apodized.
Figure 3B:
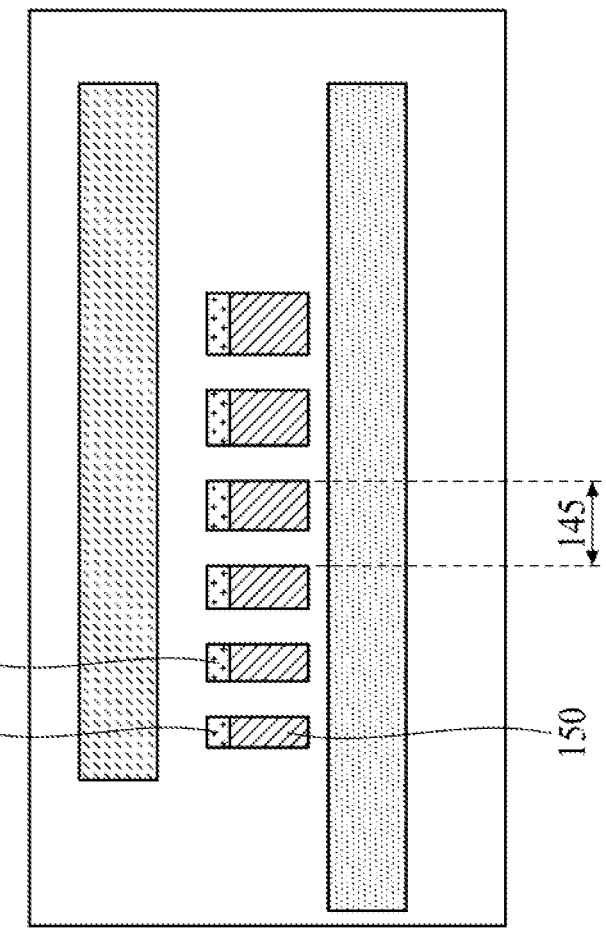
FIG. 3B is a magnified side cross-sectional view of the third embodiment of an apodized Bragg grating.

In the Bragg gratings illustrated in FIG. 1C and FIG. 1D and FIG. 2, the ridges 150 have the three-dimensional shape of a rectangular cuboid, a six-sided shape in which all angles are right angles and the opposite faces are the same. FIG. 3A and FIG. 3B illustrate a third embodiment which can be used for the Bragg grating of the photonic vertical grating filter. FIG. 3A is a magnified top view, and FIG. 3B is a magnified side cross-sectional view.

Here, the Bragg grating is apodized. This refers to grading the refractive index of each ridge to approach zero (relative to the refractive index of the dielectric layer) at the end of the grating. This is done to suppress side lobes that may arise, and to also increase the filtering effect of the filter. As illustrated here, in one method of apodizing the Bragg grating, the grating period is maintained between ridges 150, and the ridges 150 have a curved shape when seen from the top view of FIG. 3A. The ridges curve outwards from the center of the Bragg grating. Each ridge has the three-dimensional shape of a partial annular cylinder. Different apodization profiles are known, such as a Gaussian profile. An overlay 152 may still be applied to each ridge, as previously illustrated in FIG. 2.

Figure 4:
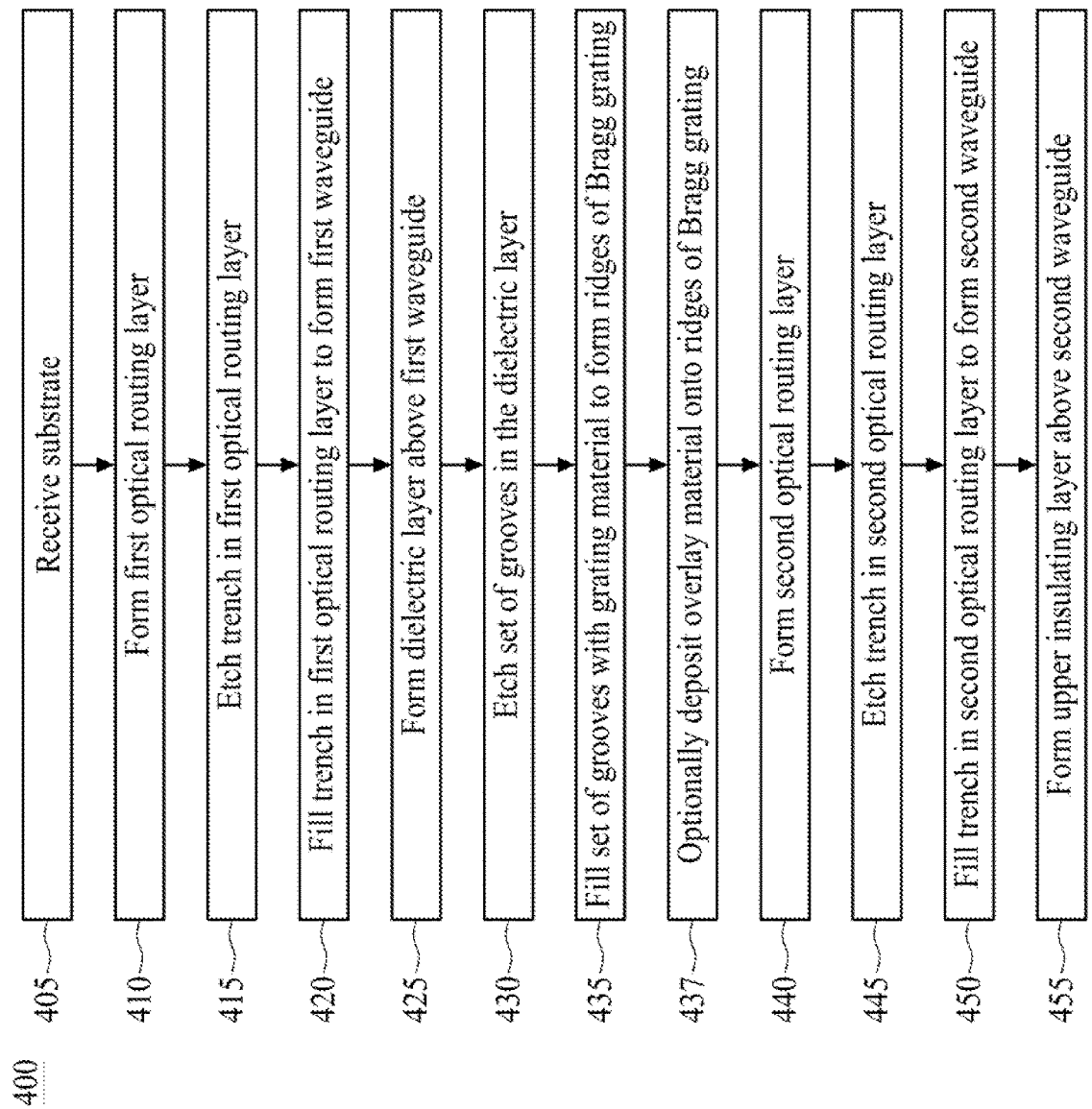
FIG. 4 is a flow chart illustrating a first method for making the photonic vertical grating filter, in accordance with some embodiments.

FIG. 4 is a flow chart illustrating an example of one method 400 for making the photonic vertical grating filter, in accordance with some embodiments. FIGS. 5A-5J illustrate various steps of the method, and these figures are discussed together. The discussion describes forming one Bragg grating, and it should be understood that the method steps can be applied to form any desired number of Bragg gratings.

Referring now to FIG. 4, in step 405, a substrate is received or provided. The substrate is usually a wafer made of a semiconducting material. Such materials can include silicon, for example in the form of crystalline Si or polycrystalline Si. The substrate can also be made from other elementary semiconductors such as germanium or $Al_2O_3$ (sapphire), or may include a compound semiconductor such as silicon carbide (SiC), gallium nitride (GaN), gallium arsenide (GaAs), indium arsenide (InAs), and indium phosphide (InP), or from other materials such as glass, a ceramic, or a dielectric material.

Next, in step 410, a first optical routing layer is formed. The first optical routing layer is electrically insulating. This layer may be formed using processes such as thermal oxidation, atomic layer deposition (ALD) or chemical vapor deposition (CVD), including plasma-enhanced atomic layer deposition (PEALD) or plasma-enhanced chemical vapor deposition (PECVD). In particular embodiments, the first optical routing layer is formed from silicon dioxide ($SiO_2$).

Continuing, next, a photoresist layer is deposited and patterned. The photoresist may be applied, for example, by spin coating, or by spraying, roller coating, dip coating, or extrusion coating. Typically, in spin coating, the substrate is placed on a rotating platen, which may include a vacuum chuck that holds the substrate in plate. The photoresist is then applied to the center of the substrate. The speed of the rotating platen is then increased to spread the photoresist evenly from the center of the substrate to the perimeter of the substrate. The rotating speed of the platen is then fixed, which can control the thickness of the final photoresist layer. The photoresist can be baked or cured to remove the solvent and harden the photoresist layer. The photoresist is then exposed to patterned light, and then developed to obtain a patterned photoresist layer. In particular embodiments, extreme ultraviolet (EUV) light having a wavelength of about 13.5 nm is used for patterning, as this permits smaller feature sizes to be obtained.

In step 415, the first optical routing layer is then etched to form a trench within the first optical routing layer. Generally, any etching step used herein may be performed using wet etching, dry etching, or plasma etching processes such as reactive ion etching (RIE) or inductively coupled plasma (ICP), as appropriate. The etching may be anisotropic. Depending on the material, etchants may include carbon tetrafluoride ($CF_4$), hexafluoroethane ($C_2F_6$), octafluoropropane ($C_3F_8$), fluoroform ($CHF_3$), difluoromethane ($CH_2F_2$), fluoromethane ($CH_3F$), trifluoromethane ($CHF_3$), carbon fluorides, nitrogen ($N_2$), hydrogen ($H_2$), oxygen ($O_2$), argon (Ar), xenon (Xe), xenon difluoride ($XeF_2$), helium (He), carbon monoxide (CO), carbon dioxide ($CO_2$), fluorine ($F_2$), chlorine ($Cl_2$), oxygen ($O_2$), hydrogen bromide (HBr), nitric acid ($HNO_3$), hydrofluoric acid (HF), ammonium fluoride ($NH_4F$), nitrogen trifluoride ($NF_3$), sulfur hexafluoride ($SF_6$), boron trichloride ($BCl_3$), ammonia ($NH_3$), bromine ($Br_2$), nitrogen trifluoride ($NF_3$), or the like, or combinations thereof in various ratios.

In step 420, the first waveguide is then formed in the trench in the first optical routing layer. In particular embodiments, the first waveguide comprises silicon nitride ($Si_3N_4$). Silicon nitride can be deposited using PECVD or low pressure chemical vapor deposition (LPCVD) by the reaction of dichlorosilane ($SiH_2Cl_2$) with ammonia ($NH_3$). The patterned photoresist layer is then removed.

Figure 5A:
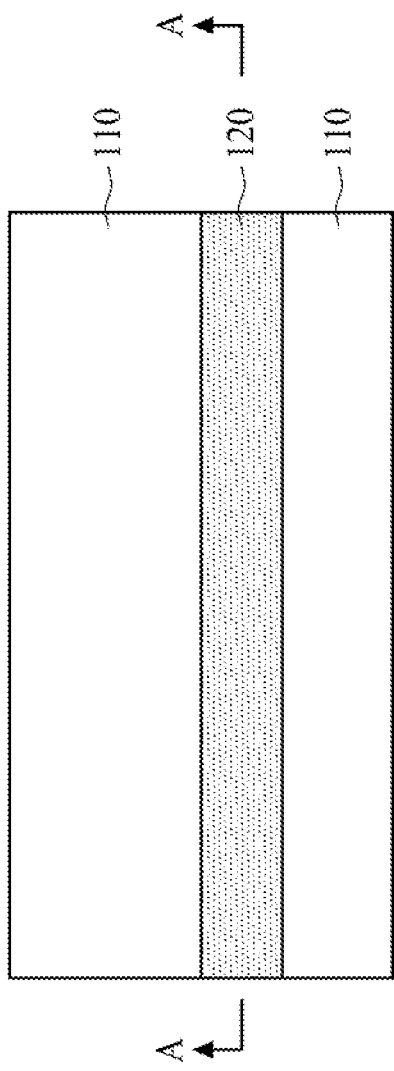
Figure 5B:
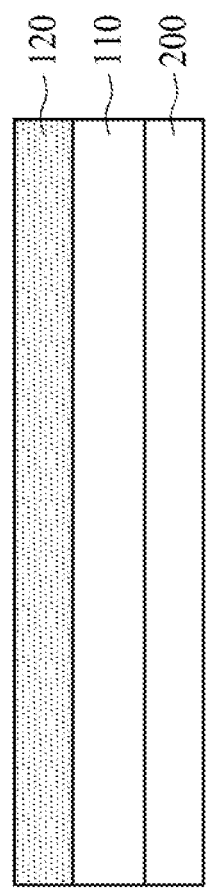

FIG. 5A is a plan view illustrating the resulting structure after this step. FIG. 5B is a side cross-sectional view along line A-A of FIG. 5A. All subsequent cross-sectional views in FIGS. 5C-5J are also along this line. Continuing, the first optical routing layer 110 is present upon the substrate 200, with the first waveguide 120 located in the first optical routing layer 110. It is noted the top of the first waveguide 120 is exposed.

Next, in step 425, a dielectric layer is formed above the first optical routing layer. The dielectric layer is formed from a first dielectric material. In particular embodiments, the first dielectric material is also silicon dioxide ($SiO_2$). This may be done using CVD, for example, or other suitable processes.

Another photoresist layer is deposited and patterned upon the dielectric layer. In step 430, the dielectric layer is then etched to form a set of grooves in the dielectric layer. The set of grooves corresponds to a Bragg grating. To form multiple Bragg gratings, multiple sets of grooves are etched. In step 435, a grating material is deposited into the set of grooves, to form the ridges of the Bragg grating. The grating material has a refractive index which is higher than the first dielectric material that forms the dielectric layer. The patterned photoresist layer is then removed. Different grating materials may be deposited into different sets of grooves, if desired.

Figure 5C:
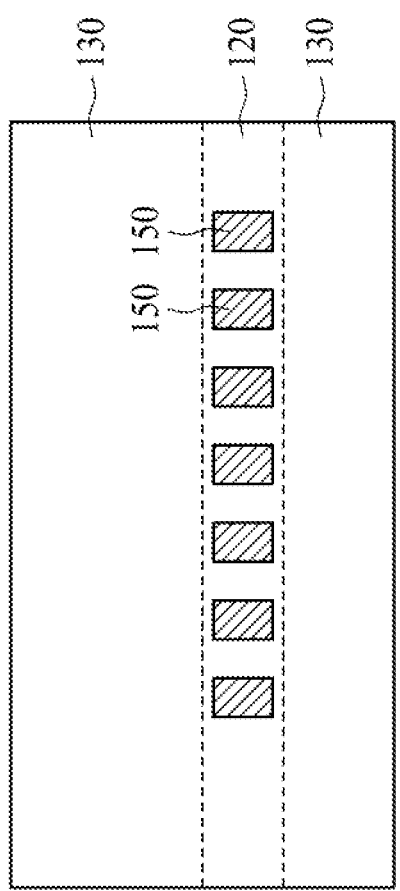
Figure 5D:
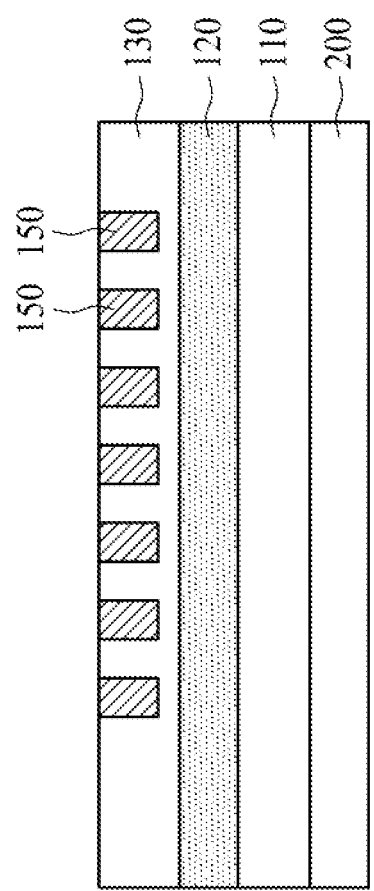

FIG. 5C is a plan view, and FIG. 5D is a side cross-sectional view illustrating the resulting structure after this step. As seen here, the ridges 150 are present in the dielectric layer 130 over the first waveguide 120. The first waveguide is marked with a dashed line to indicate it is below the dielectric layer. It is noted that the majority of the first optical routing layer 110 and the dielectric layer 130 are made of the same material (e.g. $SiO_2$). In addition, the ridges 150 are still exposed at the top of the dielectric layer. If desired, the top of the dielectric layer can be planarized, for example using chemical-mechanical polishing (CMP).

Optionally, an overlay may be applied to the ridges. Another photoresist layer can be deposited and patterned upon the dielectric layer to expose the ridges. In optional step 437, an overlay material is then deposited upon the ridges. The patterned photoresist layer is then removed, and CMP may be performed again to planarize the top surface. FIG. 5E is a plan view, and FIG. 5F is a side cross-sectional view illustrating the resulting structure after this optional step, and shows the overlay 152 upon the ridges 154.

Next, in step 440, a second optical routing layer is formed. The second optical routing layer is also electrically insulating, and can be formed as previously described. In particular embodiments, the second optical routing layer is formed from silicon dioxide ($SiO_2$).

Continuing, next, a photoresist layer is deposited and patterned. In step 445, the second optical routing layer is then etched to form a trench within the second optical routing layer. In step 450, the second waveguide is then formed in the trench in the second optical routing layer. This can be done by CVD, ALD, or other suitable processes. In particular embodiments, the second waveguide comprises silicon nitride ($Si_3N_4$). The patterned photoresist layer is then removed. CMP may be performed again if desired.

Figure 5G:
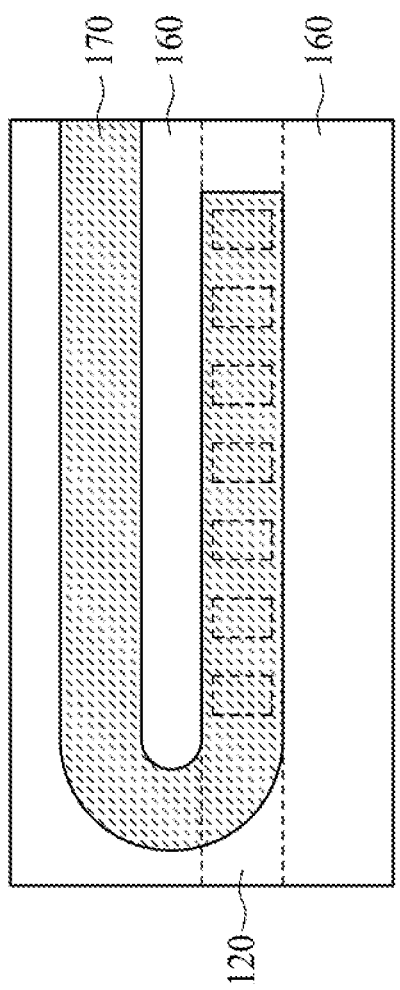
Figure 5H:
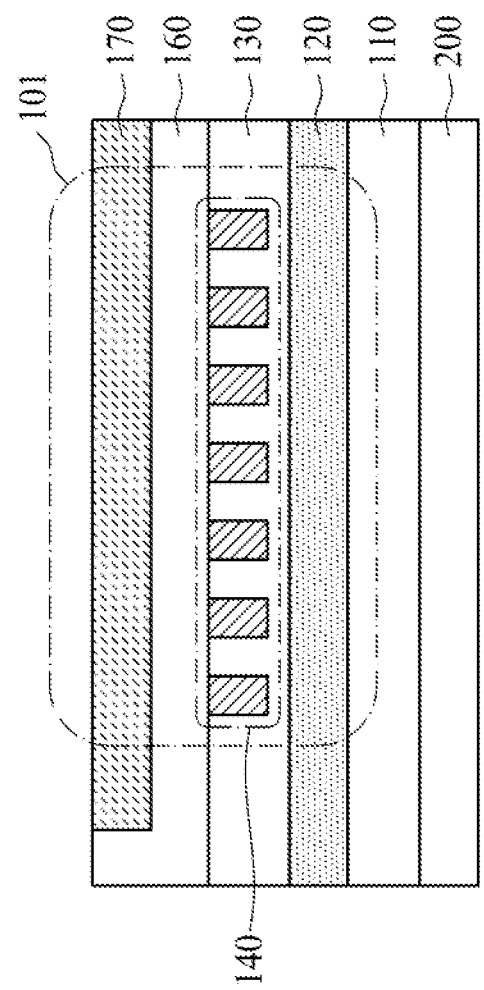

FIG. 5G is a plan view, and FIG. 5H is a side cross-sectional view illustrating the resulting structure after this step. It is noted that the optional overlay is not illustrated in these figures or the following figures. The second waveguide 170 is located in the second optical routing layer 160. The ridges are also marked with a dashed line to indicate they are below the second optical routing layer. It is noted that the first waveguide 120, the Bragg grating 140, and the second waveguide 170 all overlap in a vertical overlap region 101.

Finally, in step 455, an upper insulating layer or cladding layer is deposited upon the second optical routing layer. In particular embodiments, this upper insulating layer is formed from silicon dioxide ($SiO_2$).

Figure 5I:
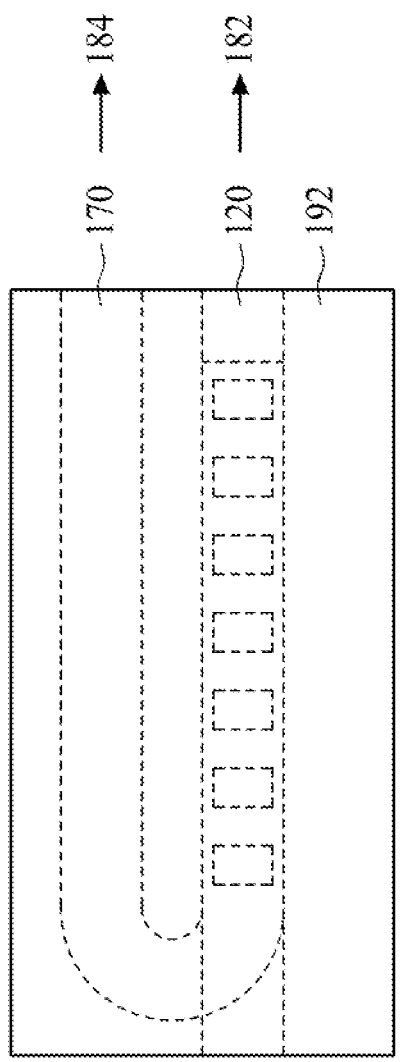
Figure 5J:
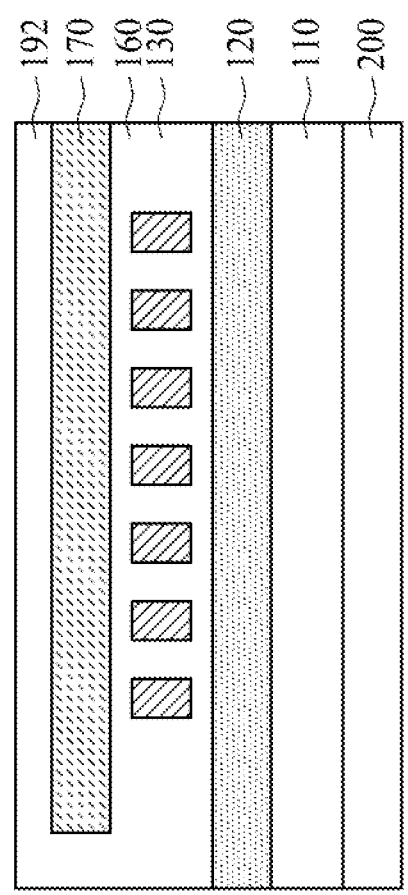

FIG. 5I is a plan view, and FIG. 5J is a side cross-sectional view illustrating the resulting structure after this step, and completes the formation of a photonic vertical grating filter. The second waveguide 170 is also marked with a dashed line to indicate it is below the upper insulating layer 192. The throughput 182 from the first waveguide 120 and the filtered output 184 from the second waveguide 170 can be used as inputs to another photonic device or further processed, for example by being converted into an electrical signal.

FIG. 6 is a flow chart illustrating an example of another method 600 for making the photonic vertical grating filter, in accordance with some embodiments. FIGS. 7A-7J also illustrate various steps of this method, and these figures are discussed together. Many of the steps are similar to those previously discussed with respect to FIG. 4, and that discussion is incorporated herein.

Referring now to FIG. 6, in step 605, a substrate is received or provided. Next, in step 610, a first electrically insulating layer is formed. In particular embodiments, the first electrically insulating layer is formed from silicon dioxide ($SiO_2$).

Next, in step 615, a first waveguide layer is deposited over the first electrically insulating layer. In particular embodiments, the first waveguide layer is formed from silicon nitride ($Si_3N_4$). A photoresist layer is then deposited and patterned. Then, in step 620, the first waveguide layer is then etched to form the first waveguide. The patterned photoresist layer is then removed.

Figure 7A:
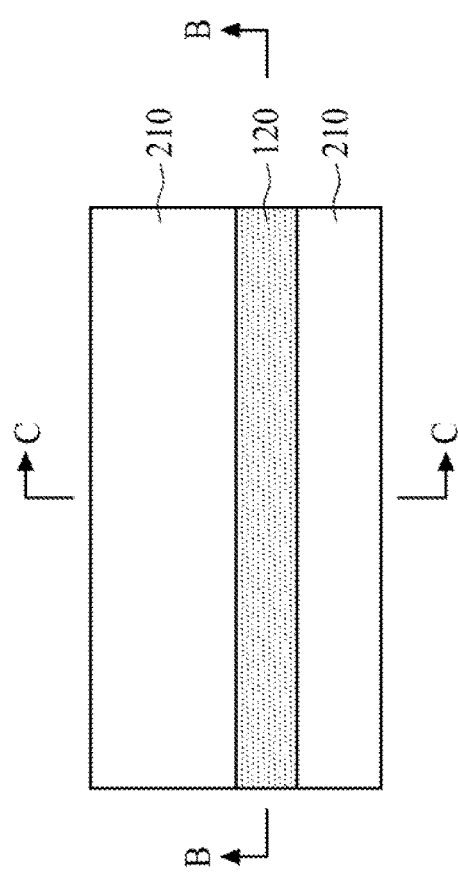
FIGS. 7A-7J illustrate various cross-sectional views of intermediate stages for forming the photonic vertical grating filter as described in FIG. 6.
Figure 7B:
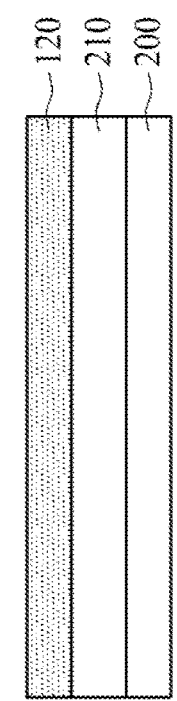
Figure 7C:
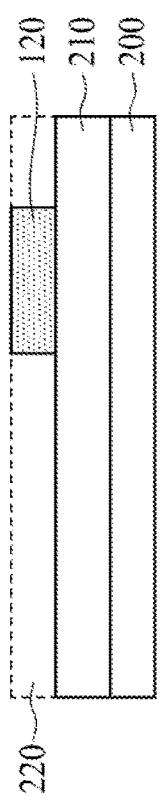

FIG. 7A is a plan view illustrating the resulting structure after this step. FIG. 7B is a length-wise cross-sectional view along line B-B of FIG. 7A. FIG. 7C is a width-wise cross-sectional view along line C-C of FIG. 7A. All subsequent cross-sectional views in FIGS. 7D-7I will also be along these lines as indicated. The first electrically insulating layer 210 is located on the substrate 200. The first waveguide 120 is located above the first electrically insulating layer 210, and is not yet surrounded by an electrically insulating material. The first waveguide layer (which has been etched) is marked with reference numeral 220, and is indicated in dashed lines in FIG. 7C.

Next, in step 625, a second electrically insulating layer 230 is deposited upon the first electrically insulating layer 210 and the first waveguide 120, so as to cover the first waveguide 120. In particular embodiments, the second electrically insulating layer is also made of silicon dioxide ($SiO_2$), i.e. the same material as the first electrically insulating layer. The first electrically insulating layer and the second electrically insulating layer have a lower refractive index than the first waveguide. CMP may be performed to planarize the top surface of the second electrically insulating layer.

Figure 7D:
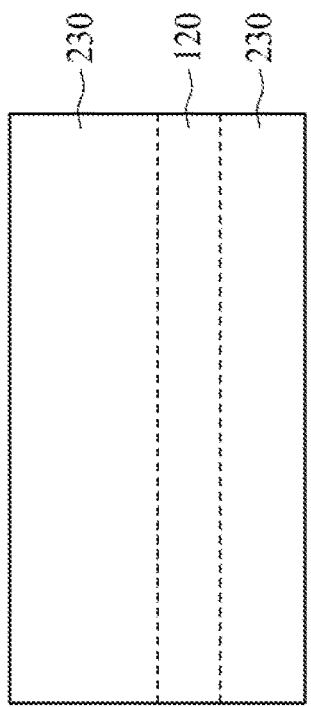
Figure 7E:
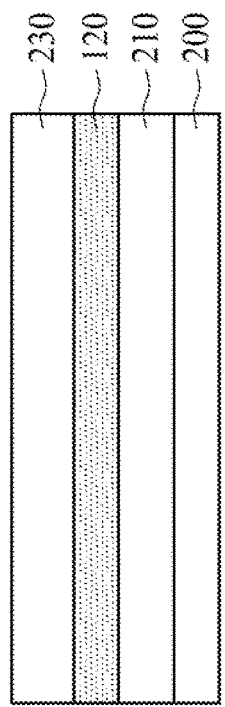
Figure 7F:
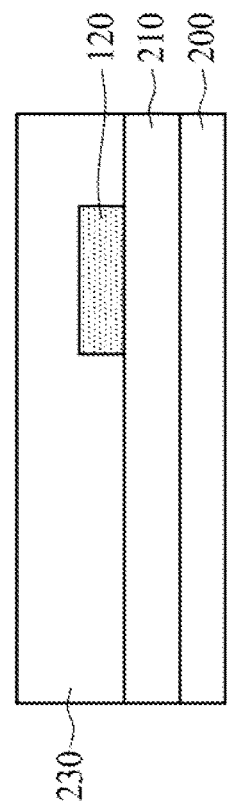

FIG. 7D is a plan view illustrating the resulting structure after this step. FIG. 7E is a length-wise cross-sectional view. FIG. 7F is a width-wise cross-sectional view. The first waveguide 120 is drawn in dashed lines to indicate it is below the second electrically insulating layer 230.

Continuing with the method of FIG. 6, another photoresist layer is deposited and patterned upon the second electrically insulating layer. In step 630, the second electrically insulating layer is then etched to form a set of grooves in the second electrically insulating layer. The set of grooves corresponds to a Bragg grating. In step 635, a grating material is deposited into the set of grooves, to form the ridges of the Bragg grating. The grating material has a refractive index which is higher than the first dielectric material that forms the dielectric layer. The patterned photoresist layer is then removed.

The resulting structure after this step is identical to that illustrated in FIG. 5C and FIG. 5D. The ridges 150 are visible in the second electrically insulating layer 230. The first electrically insulating layer 210 and the second electrically insulating layer 230 of FIG. 7D correspond to the combination of the first optical routing layer 110 and the dielectric layer 130 of FIG. 5C.

As indicated in optional step 637, an overlay material may be deposited upon the ridges.

Next, in step 640, a third electrically insulating layer is formed over the Bragg grating 140. In particular embodiments, the third electrically insulating layer is formed from silicon dioxide ($SiO_2$). Then, in step 645, a second waveguide layer is deposited over the third electrically insulating layer. In particular embodiments, the second waveguide layer is formed from silicon nitride ($Si_3N_4$). A photoresist layer is then deposited and patterned. Then, in step 650, the second waveguide layer is then etched to form the second waveguide. The patterned photoresist layer is then removed.

Figure 7G:
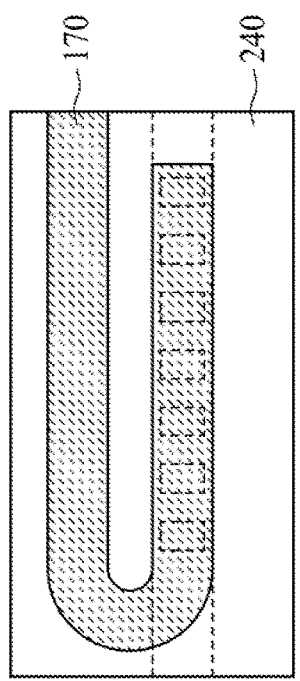
Figure 7H:
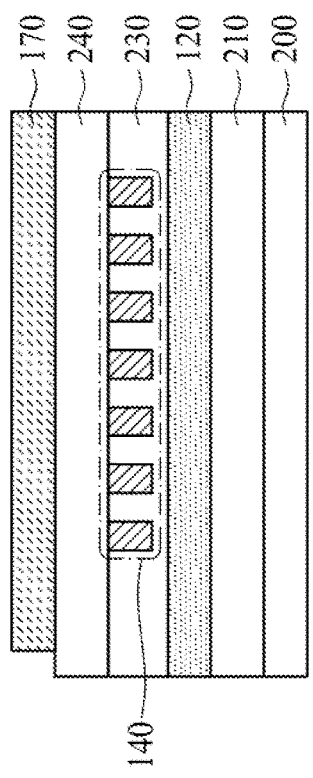
Figure 7I:
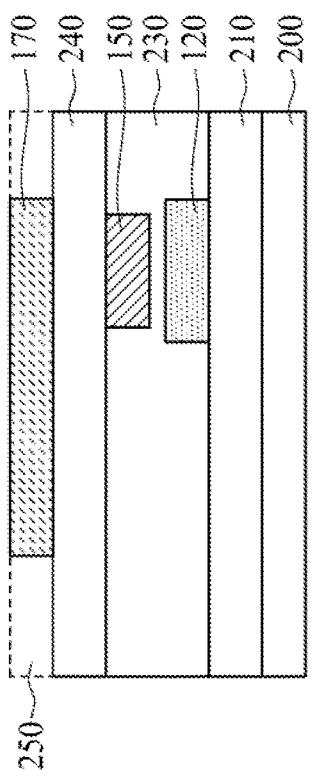
Figure 7J:
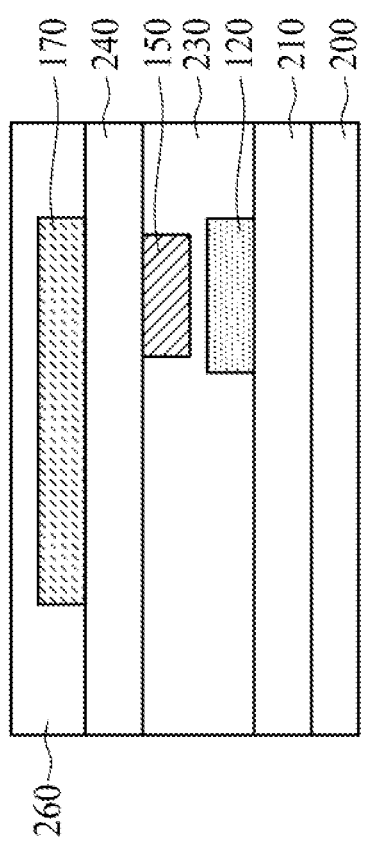

FIG. 7G is a plan view illustrating the resulting structure after this step. FIG. 7H is a length-wise cross-sectional view. FIG. 7I is a width-wise cross-sectional view. The second waveguide 170 is on top of the third electrically insulating layer 240. The second waveguide layer (which has been etched) is marked with reference numeral 250, and is indicated in dashed lines in FIG. 7I.

Continuing, in step 655, a fourth electrically insulating layer 260 is deposited upon the third electrically insulating layer 240 and the second waveguide 170, so as to cover the second waveguide 170. In particular embodiments, the fourth electrically insulating layer is also made of silicon dioxide ($SiO_2$), i.e. the same material as the third electrically insulating layer. The third electrically insulating layer and the fourth electrically insulating layer have a lower refractive index than the second waveguide. CMP may be performed to planarize the top surface of the fourth electrically insulating layer.

The resulting structure after this step is identical to that illustrated in FIG. 5I and FIG. 5J. A width-wise cross-sectional view is also provided as FIG. 7J. The combination of the third electrically insulating layer 240 and the fourth electrically insulating layer 260 correspond to the combination of the second optical routing layer 160 and the upper insulating layer 190 of FIG. 5J. Again, it is noted that multiple filter layers can be stacked for additional processing of the outputs from the first waveguide and the second waveguide.

Figure 8:
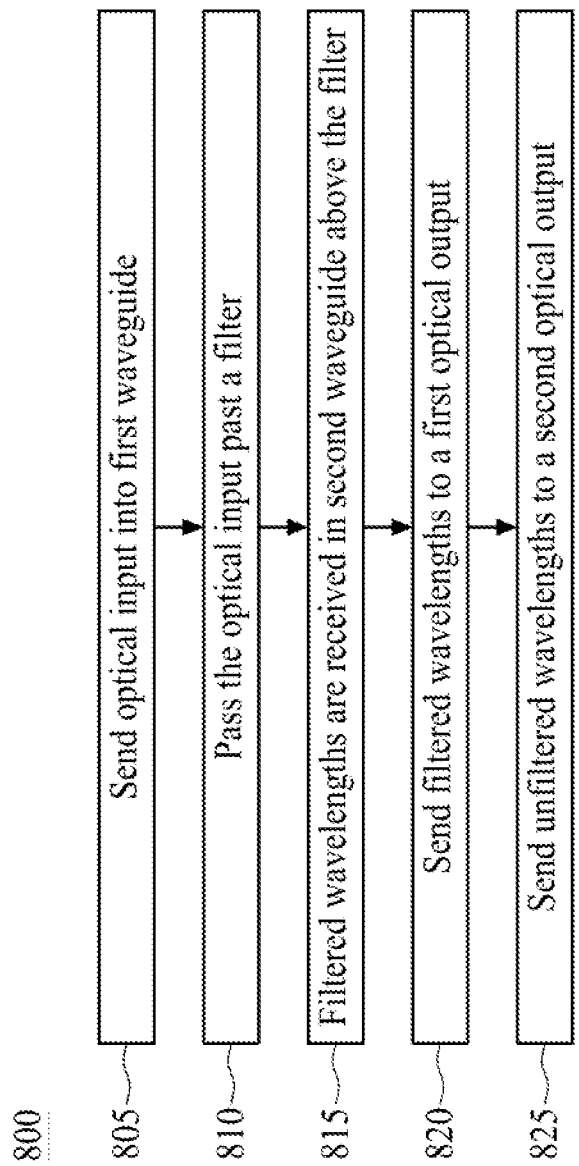
FIG. 8 is a flow chart illustrating a method for using the photonic vertical grating filter, in accordance with some embodiments.

FIG. 8 is a flow chart illustrating a method 800 for using the photonic vertical grating filter, in accordance with some embodiments. In step 805, an optical input is sent into a first waveguide. The optical input comprises a plurality of different wavelengths. In step 810, the optical input passes past a filter which is formed from one or more Bragg gratings. The Bragg gratings each have a different grating period. The Bragg gratings are located in a dielectric layer above the first waveguide. In step 815, the filtered wavelength(s) are received in a second waveguide located above the filter. In step 820, the filtered wavelength(s) are sent through the second waveguide to a first optical output, or filtered output. In step 825, the unfiltered wavelength(s) remaining in the first waveguide are sent to a second optical output, or throughput. The filtered output and the throughput may be further processed, for example through additional filters to further isolate particular wavelengths.

The photonic vertical grating filters of the present disclosure have several benefits. First, they greatly reduce the surface area and the length needed for the filtering function, thus increasing component density for the overall SOI platform. The length of the filter may be reduced by more than one-half, because the thickness of the Bragg grating can be increased, which increases the reflection intensity. The thickness and apodization design between the two waveguides is greater than conventional designs, which reduces sensitivity to dimensional changes and avoids the influence of process variation and increases process tolerances. The design of the Bragg gratings can be varied as desired to improve performance characteristics such as the reflection intensity or strength, the bandwidth, and/or the extinction ratio. The characteristics can be adjusted freely between layers, or can be used independently, or can be integrated between multiple layers. The process uses CMOS-compatible manufacturing processes, and is easily scalable. The grating filters can also be easily integrated with other photonic components to obtain a large-scale photonic integrated circuit (PIC).

The photonic vertical grating filters of the present disclosure can be used in many different types of photonic circuits. For example, they can be used in sub-wavelength multiplexers, multi-output demultiplexers, tunable Bragg resonators, tunable optical delay lines, optical couplers, optical splitters, and/or optical combiners.

Some embodiments of the present disclosure thus relate to photonic devices and vertical photonic grating filters that comprise a first waveguide, a second waveguide, and a plurality of Bragg gratings. The Bragg gratings are formed in a dielectric layer between the first waveguide and the second waveguide, and are located in a vertical overlap region between the first waveguide and the second waveguide. Each Bragg grating has a different grating period.

Also disclosed herein are various methods for making a photonic vertical grating filter. A first waveguide is formed in a first optical routing layer on a substrate. A dielectric layer is then formed above the first waveguide from a first dielectric material. A plurality of sets of grooves are etched in the dielectric layer, each set of grooves having a different grating period. One or more grating materials are deposited into the plurality of sets of grooves, wherein each grating material has a refractive index higher than the dielectric layer. A plurality of Bragg gratings is thus formed. A second waveguide is then formed in a second optical routing layer on the substrate. The first waveguide, the plurality of Bragg gratings, and the second waveguide overlap in a vertical overlap region.

Also disclosed herein are methods for filtering multiple wavelengths in an optical input. An optical input comprising a plurality of different wavelengths is sent into a first waveguide. The optical input passes past a filter formed from a plurality of Bragg gratings located in a dielectric layer above the first waveguide. Each Bragg grating has a different grating period. The filtered wavelengths that pass through the filter are received in a second waveguide located above the filter, and sent to a first optical output. The unfiltered wavelengths continue in the first waveguide to a second optical output.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for making a photonic vertical grating filter, comprising:
   forming a first optical routing layer on a substrate;
   forming a first waveguide in the first optical routing layer;
   forming a dielectric layer above the first waveguide from a first dielectric material;
   etching a plurality of sets of grooves in the dielectric layer, each set of grooves having a different grating period;
   depositing a grating material into the plurality of sets of grooves to form ridges, wherein the grating material has a refractive index higher than the dielectric layer, to obtain a plurality of Bragg gratings; and
   forming a second waveguide in a second optical routing layer on the substrate;
   wherein the first waveguide, the plurality of Bragg gratings, and the second waveguide overlap in a vertical overlap region.

2. The method of claim 1, wherein the ridges have a higher refractive index than the dielectric layer.

3. The method of claim 2, wherein the ridges of each Bragg grating have a length of about 20% to about 80% of a period of that Bragg grating.

4. The method of claim 2, wherein the ridges comprise hafnium oxide, zirconium oxide, aluminum oxide, hafnium silicate, zirconium silicate, hafnium oxynitride, zirconium oxynitride, silicon oxynitride, boron nitride, silicon carbide, silicon nitride, or silicon.

5. The method of claim 2, further comprising applying an overlay into the plurality of sets of grooves prior to forming the second waveguide.

6. The method of claim 5, wherein the overlay has a thickness of about 10% to about 50% of the ridge.

7. The method of claim 1, wherein each Bragg grating in the plurality of Bragg gratings is apodized.

8. The method of claim 1, wherein each Bragg grating in the plurality of Bragg gratings has a grating period of about 200 nanometers to about 350 nanometers.

9. The method of claim 1, wherein each Bragg grating in the plurality of Bragg gratings has a spacing of about 5% to about 95% of a grating period of that Bragg grating.

10. The method of claim 1, wherein each Bragg grating in the plurality of Bragg gratings has a thickness of about 150 nanometers to about 900 nanometers.

11. The method of claim 1, wherein each Bragg grating in the plurality of Bragg gratings has a width of about 50% to about 100% of a width of the first waveguide.

12. The method of claim 1, wherein each Bragg grating in the plurality of Bragg gratings is independently spaced apart from the first waveguide and the second waveguide by a gap of about 10 nanometers to about 500 nanometers.

13. The method of claim 1, wherein the first waveguide and the second waveguide each have a thickness of about 150 nanometers to about 1000 nanometers.

14. The method of claim 1, wherein the first waveguide and the second waveguide each have a width of about 100 nanometers to about 3000 nanometers.

15. The method of claim 1, wherein the grating material also has a dielectric constant of at least 10.

16. A vertical photonic grating filter, comprising:
   a first waveguide;
   a second waveguide; and
   a plurality of Bragg gratings formed in a dielectric layer between the first waveguide and the second waveguide, the plurality of Bragg gratings being located in a vertical overlap region between the first waveguide and the second waveguide, each Bragg grating having a different grating period;
   wherein a first gap is present between the first waveguide and each Bragg grating in the plurality of Bragg gratings, and a second gap is present between the second waveguide and each Bragg grating in the plurality of Bragg gratings.

17. The filter of claim 16, wherein the first waveguide and the second waveguide comprise silicon nitride.

18. The filter of claim 16, wherein each Bragg grating in the plurality of Bragg gratings comprises a plurality of ridges, wherein the ridges have a higher refractive index than the dielectric layer.

19. A method for filtering multiple wavelengths in an optical input, comprising:
   sending the optical input into a first waveguide, the optical input comprising a plurality of different wavelengths;
   passing the optical input past a filter formed from a plurality of Bragg gratings located in a dielectric layer above the first waveguide, each Bragg grating having a different grating period; and
   receiving filtered wavelengths in a second waveguide located above the filter; and
   sending the filtered wavelengths in the second waveguide to an optical output.

20. The method of claim 19, wherein unfiltered wavelengths remain in the first waveguide.

* * * * *